United States Patent [19]

Kessler et al.

[11] Patent Number: 5,105,297

[45] Date of Patent: Apr. 14, 1992

[54] MOUNT FOR AN OPTICAL ELEMENT

[75] Inventors: David Kessler; Miroslav K. Gross, both of Rochester, N.Y.

[73] Assignee: Eastman Kodak Company, Rochester, N.Y.

[21] Appl. No.: 390,848

[22] Filed: Aug. 8, 1989

[51] Int. Cl.⁵ .............................................. G02B 26/08
[52] U.S. Cl. ................................................... 359/198
[58] Field of Search ................ 350/486, 171, 636, 252, 350/287

[56] References Cited

U.S. PATENT DOCUMENTS

| | | | |
|---|---|---|---|
| 2,758,502 | 8/1956 | Scott et al. | 88/14 |
| 3,707,723 | 12/1972 | Levene | 346/108 |
| 3,724,953 | 4/1973 | Johnston, Jr. | 350/486 |
| 4,011,003 | 3/1977 | Dragt | 350/6 |
| 4,021,096 | 5/1977 | Dragt | 350/6 |
| 4,073,567 | 2/1978 | Lakerveld et al. | 350/6.5 |
| 4,128,297 | 12/1978 | Bourne | 350/6.1 |
| 4,165,921 | 8/1979 | Kirsch | 350/288 |
| 4,171,902 | 10/1979 | Imai et al. | 355/11 |
| 4,256,364 | 3/1981 | Minoura et al. | 350/6.9 |
| 4,386,843 | 6/1983 | Seedhouse | 355/8 |
| 4,560,244 | 12/1985 | Ackerman | 350/486 |
| 4,880,301 | 11/1989 | Gross | 350/171 |

FOREIGN PATENT DOCUMENTS 1374598  8/1964  France .

Primary Examiner—Bruce Y. Arnold
Assistant Examiner—Rebecca D. Gass
Attorney, Agent, or Firm—Donald D. Schaper

[57] ABSTRACT

A mount for an optical element is disclosed in which an optical element can be adjusted to a plurality of positions to change the position of an output beam. In order to provide a mount which can be adjusted to precisely position the output beam in orthogonal directions, the optical element is mounted in a holder which is rotatable about a first axis, and the holder is mounted on a support which is rotatable about a second axis. When the optical element is rotated about the first axis, the output beam is adjusted along an arc in an X direction; and when the support with the holder thereon is rotated about the second axis, the output beam is adjusted along an arc in a Y direction.

2 Claims, 7 Drawing Sheets

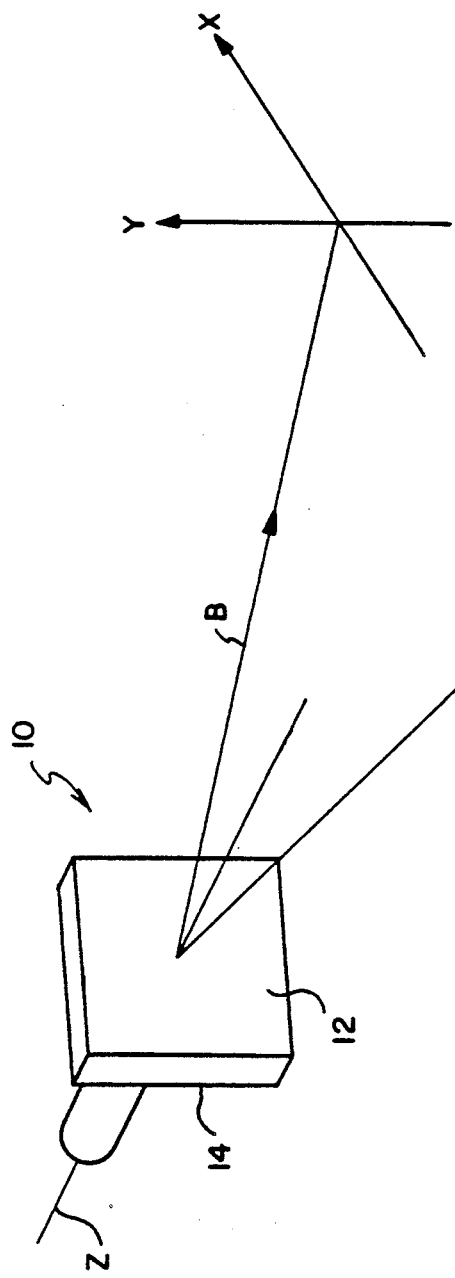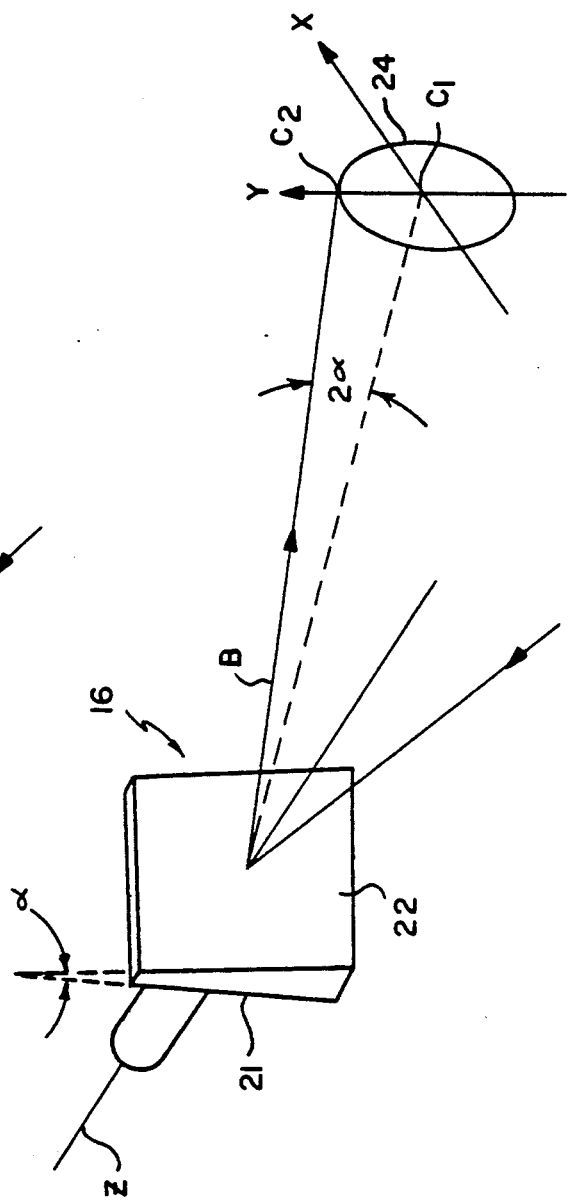
FIG. 1a
FIG. 1b

MOUNT FOR AN OPTICAL ELEMENT

CROSS REFERENCE TO RELATED APPLICATION

Reference is made to commonly-assigned U.S. application Ser. No. 191,524, entitled "Mount For An Optical Element", filed in the name of Miroslav K. Gross, on May 9, 1988, and granted as U.S. Pat. No. 4,880,301, on Nov. 14, 1989.

BACKGROUND OF THE INVENTION

1. Field of the Invention

The present invention relates to a mount for an optical element, and more particularly, to such a mount which can be adjusted to accurately position an optical element in optical apparatus.

2. State of the Prior Art

Optical elements must be very accurately positioned in certain types of apparatus such as apparatus using lasers as a light source. Mounts for the optical elements must be adjustable in order to position the element relative to a laser beam and to compensate for changes in the optical system during use of the apparatus. The elements must also be capable of withstanding vibration and shock without moving from an adjusted position, and thus, the mounts for the elements must include means for locking the optical elements in an adjusted position without inducing distortion or strain in the elements. One of the main problems in prior-art mounts for optical elements is that the mounts cannot be easily adjusted to a precise position. A further problem with known mounts is that it is difficult to maintain the mounts in an adjusted position.

In U.S. Pat. No. 4,171,902, there is shown a mount for an optical element in which a mirror can be pivoted about a horizontal axis to effect adjustment of a beam in one direction and about a vertical axis to effect adjustment in a second direction. Each of the adjustments is made by means of a screw which is operative to pivot the mirror against a spring force which biases the mirror in one direction of rotation. A problem with this mount is that the adjustments about both the horizontal and vertical axes are relatively coarse adjustments, and thus, even after several iterations, it is difficult to obtain a precise adjustment of an output beam.

SUMMARY OF THE INVENTION

It is an object of the present invention to overcome the problems in the prior art noted above and to provide an improved mount for an optical element.

In accordance with one aspect of the present invention, there is provided a mount for an optical element having an optical surface thereon which is adapted to receive an input beam of light and to project an output beam therefrom, the mount being adjustable to position the output beam along a first line in the form of an arc and along a second line in the form of an arc which forms an angle with the first line, the mount comprising: means for supporting the element for rotation about a first axis; means for effecting rotation of the element about the first axis to move the output beam along the first line; means for supporting the element for rotation about a second axis disposed at a small angle to the first axis and extending in generally the same direction as the first axis; and means for effecting rotation of the element about the second axis to move the output beam along the second line.

In one embodiment of the present invention, a circular mirror is mounted on a mirror holder which is adapted to rotate about a first axis. The holder is, in turn, mounted on a support which is adapted to rotate about a second axis. The mirror is supported on the holder such that an optical surface of the mirror is supported at a small angle to a plane perpendicular to the first axis. And, the holder is supported on a surface of the support which is disposed at a small angle to a plane perpendicular to the second axis. Rotation of the holder about the first axis and relative to the support will adjust an output beam from the optical surface of the mirror along a first direction, and rotation of the support and the holder thereon about a second axis will move the output beam along a second direction.

A principal advantage of the present invention is that very fine adjustments can be made to an output beam along generally orthogonal directions. A further advantage is that the resolution, or sensitivity of adjustment, can be controlled in both of the directions by choosing the size of the off-axis angles of the support and holder. The mount of the present invention is particularly useful in optical apparatus where high precision angular control of a laser beam is required, for example, in low power laser printers and in high power beam delivery systems.

Other features and advantages will become apparent with reference to the following Description of the Preferred Embodiments when read in light of the attached drawings.

BRIEF DESCRIPTION OF THE DRAWINGS

FIGS. 1a through 1d are schematic diagrams which illustrate the present invention;

DESCRIPTION OF THE PREFERRED EMBODIMENT

Figure 4:
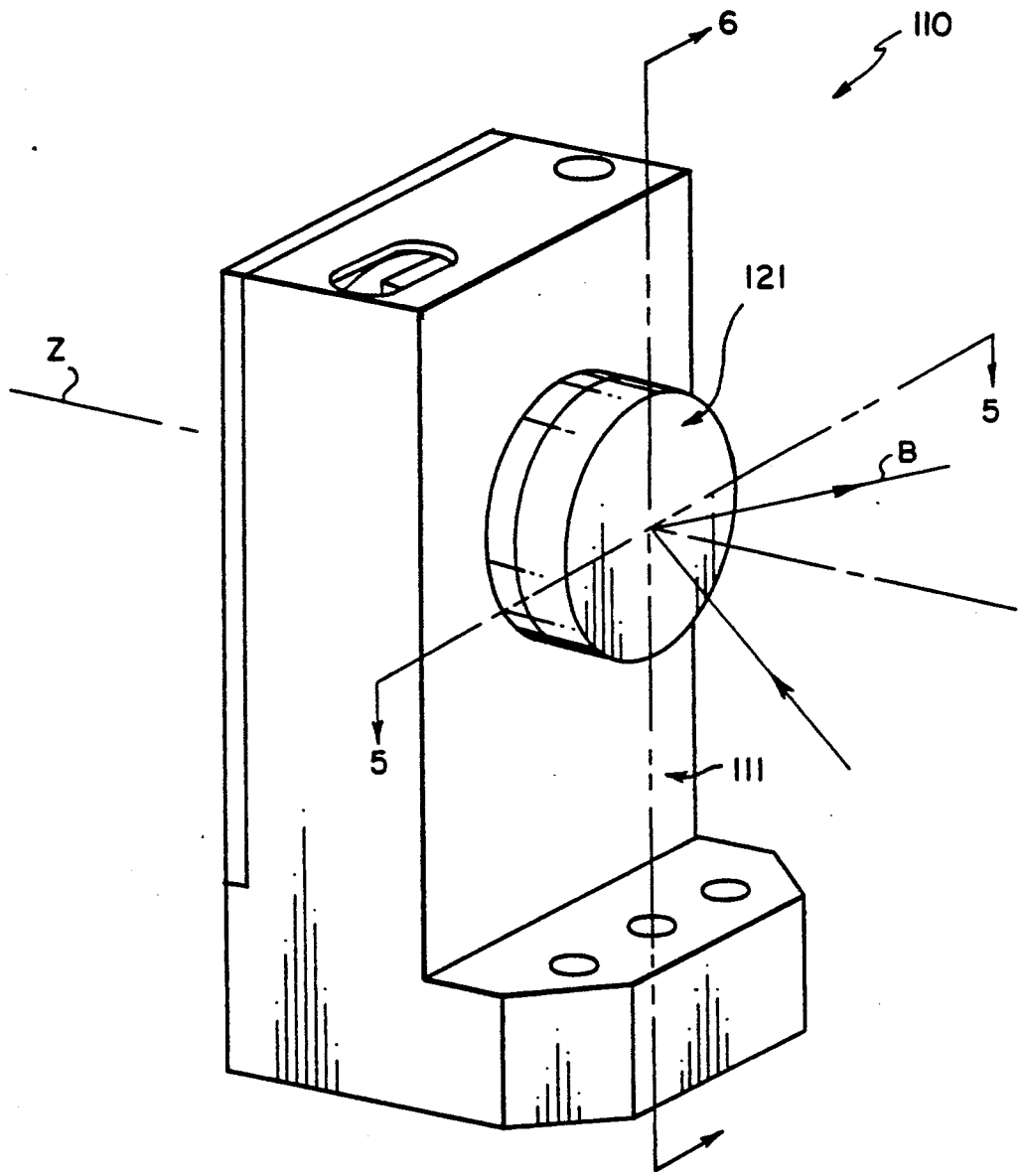
FIG. 4 is a perspective view of a mount constructed in accordance with the present invention.

The mount of the present invention is useful in optical apparatus, such as laser printers, where very high precision is required. References herein to terms such as "up," "down," "vertical," and "horizontal," refer to the present invention in the orientation shown in FIG. 4.

Figure 1C:
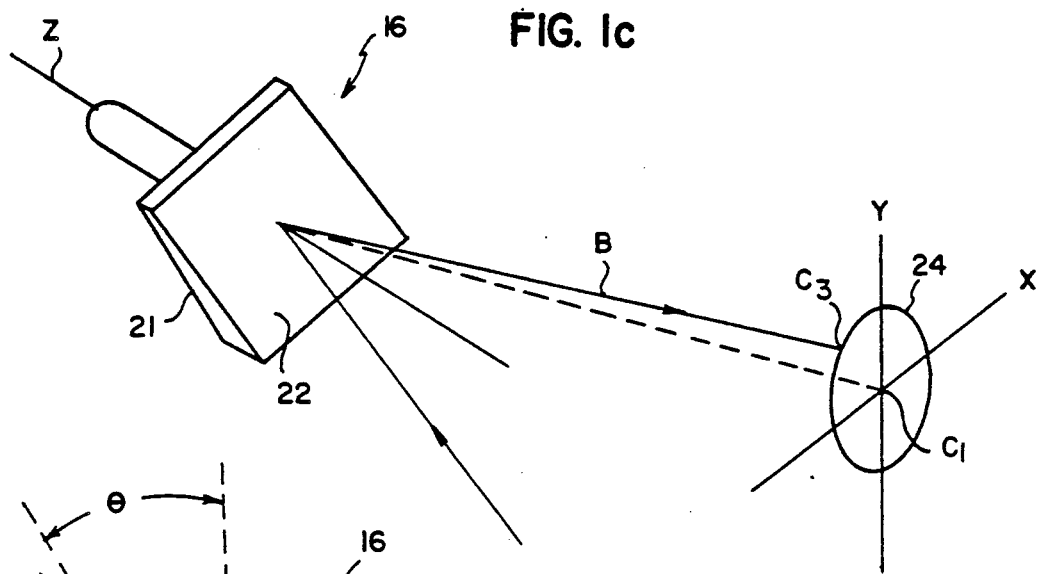

The inventive concept of the present invention is illustrated in FIGS. 1a through 1d. In FIG. 1a, there is shown a mirror 10 with a reflecting surface 12 parallel to a base surface 14. An axis of rotation Z is perpendicular to the surfaces 12 and 14. Rotation of the mirror 10 about the axis Z does not affect the position of a reflected beam B which goes through a point $C_1$ on an XY plane. In FIG. 1b, a mirror 16 is shown which has a reflecting surface 22 disposed at an angle $\alpha$ to a base surface 21. Rotation of mirror 16 about a Z axis will cause an output beam B to follow a circle 24 having an angular radius of $2\alpha$. For example, if mirror 16 is rotated by 45° about axis Z, as shown in FIG. 1c, the output beam B will go through a point $C_3$ on circle 24. Such a method of beam adjustment was disclosed and claimed in the aforementioned U.S. application, Ser. No. 191,524, and this U.S. application is expressely incorporated herein by reference.

Figure 1D:
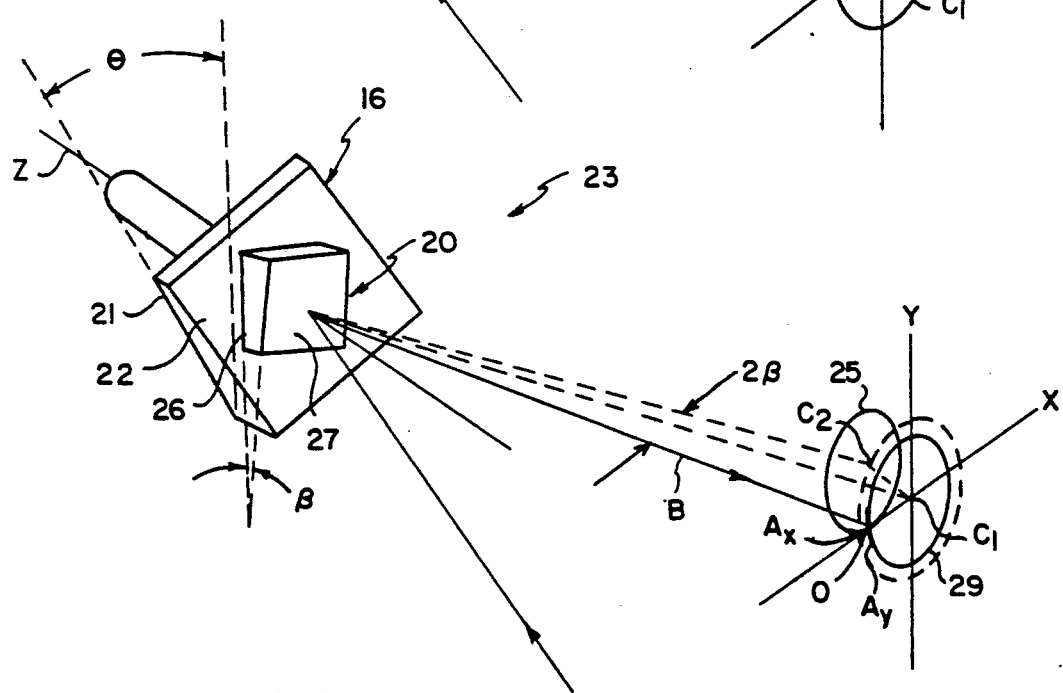

In FIG. 1d there is shown an additional mirror 20 mounted on mirror 16 to form a composite mount 23. Mirror 20 comprises a base surface 26 and a reflecting surface 27. Base surface 26 is adapted to rotate on surface 22 of mirror 16. The reflecting surface 27, is at an angle $\beta$ to surface 26. By rotating mirror 20 on surface 22, the output beam B is made to follow a circle 25 whose angular radius is $2\beta$. It is possible to use an arc $A_x$ of circle 25 for the adjustment of the output beam B in the X direction. By turning mirror 16, with mirror 20 thereon, output beam B will move along an arc, $A_y$ of a circle 29, as shown in FIG. 1d. Thus, by rotation of mirror 16, with mirror 20 thereon, the beam B is adjusted in the Y direction, and by rotating mirror 20 relative to mirror 16, the beam B is adjusted in the X direction. By selecting the size of the off-axis angles $\alpha$ and $\beta$, the sensitivity of both X and Y adjustments can be controlled. Although the output beam B follows a curved path in both the X and Y adjustments, the sag is very small, as demonstrated in the aforementioned U.S. application Ser. No. 191,524. Further, as the output beam B approaches the desired location during the adjustment process, the sag becomes small enough that the adjustment can be considered linear.

Figure 2A:
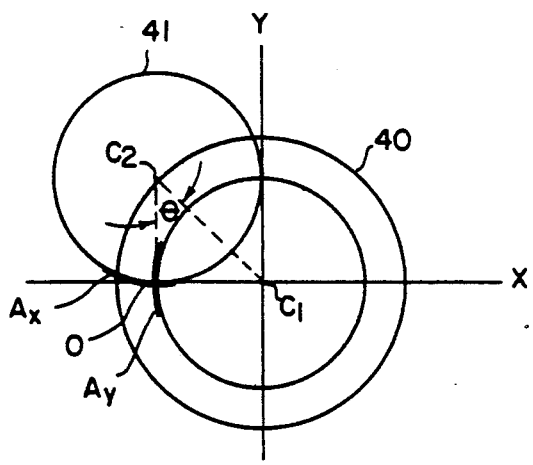
FIGS. 2a through 2e are diagrams which illustrate different configurations of the present invention.

The operation of mount 23, shown in FIG. 1d, can be illustrated with reference to the diagrams shown in FIG. 2a through FIG. 2e. The preferred arrangement is illustrated in FIG. 2a. In FIG. 2a, two conditions hold. The first condition is:

$$\beta = \frac{\alpha}{\sqrt{2}} \quad (1)$$

where $\alpha$ and $\beta$ are the off-axis angles defined above, and the second condition is:

$$\theta = 45° \quad (2)$$

where $\theta$ is the angle shown in FIGS. 1d and 2a-2e. The angle $\theta$ is the angular displacement, about the Z axis, of mirror 16 relative to mirror 20. That is, if mirror 20 is positioned in its vertical position (FIG. 1d), then the angle $\theta$ is the angular displacement of mirror 16 from its vertical position (FIG. 1b).

In FIG. 2a, a circle 40 with a radius of $2\alpha$ is shown centered at point $C_1$. Circle 40 is created when mount 23 is rotated and the angle $\beta$ equals 0. This is equivalent to the mount shown in FIG. 1c. In turning mirror 20 relative to mirror 16, the output beam B will follow a circle 41 with a radius of $2\beta$ and a center point $C_2$. If mount 23 is positioned such that mirror 20 is vertically disposed, as shown in FIG. 1d, the output beam B will be at a point 0 which is now the new origin. Turning mirror 20 relative to mirror 16 moves the beam B on an arc $A_x$ in the X direction, as shown in FIG. 2a. Turning the mount 23 moves the beam B along an arc $A_y$ in the Y direction. The two arcs $A_x$ and $A_y$ are orthogonal at point 0. It should also be noted that $OC_2$ is equal to $OC_1$.

Turning mount 23 about axis Z by a certain angle, for example 1°, the beam B is displaced in the Y direction, and the magnitude of this displacement is the same as the displacement for a 1° rotation of mirror 20 relative to mirror 16. Thus, it is apparent that by the proper choice of the angle $\beta$, according to equation (1), the X and Y adjustments have the same sensitivities. Such an arrangement has the attributes of a good mount. The two adjustments are orthogonal at the origin, and the sensitivities of the adjustments in the X and Y directions are the same. It can be shown that there are four equivalent solutions for the same $\alpha$ and $\beta$ where $C_2$ can be positioned in any one of the four quadrants. The conditions, described in equations (1) and (2), are necessary and sufficient for achieving both equal sensitivity and orthogonality.

Figure 2B:
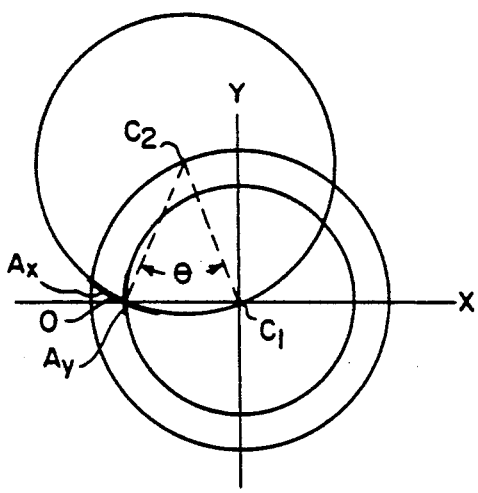
Figure 2C:
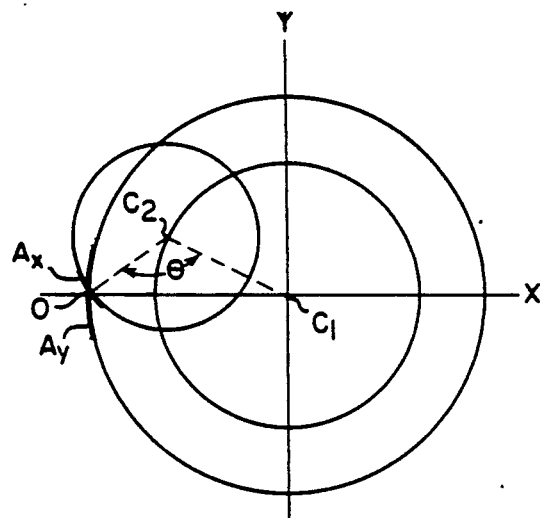
Figure 2D:
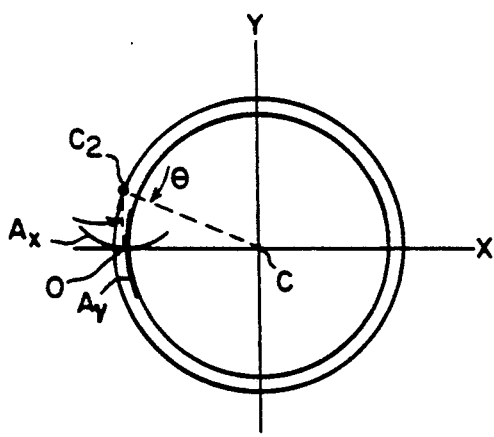
Figure 2E:
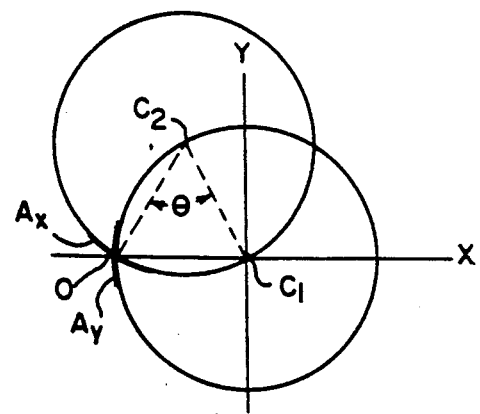

In FIGS. 2b and 2c, there are shown situations where violation of one of the two conditions results in mounts which are nonorthogonal and/or have unequal sensitivities. In FIG. 2b, $\theta = 45°$, but $\beta$ is not equal to $\alpha/2^{\frac{1}{2}}$, and in FIG. 2c, $\beta = \alpha/2^{\frac{1}{2}}$ but $\theta$ is not equal to 45°. FIGS. 2d and 2e show that, even with violation of both conditions, an arrangement for a mount can be found which has either orthogonality (FIG. 2d) or equal sensitivity (FIG. 2e), but not both. In FIG. 2e, $\theta = 60°$ and $\alpha = \beta$.

Figure 3A:
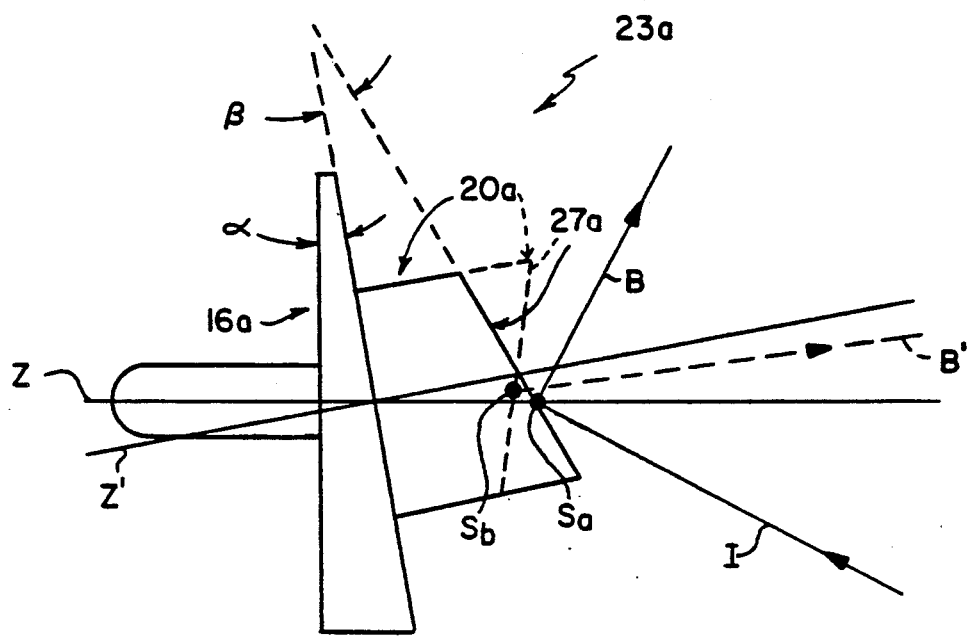
FIGS. 3a and 3b are schematic diagrams which illustrate the correction of beam displacement in the mount of the present invention.
Figure 3B:
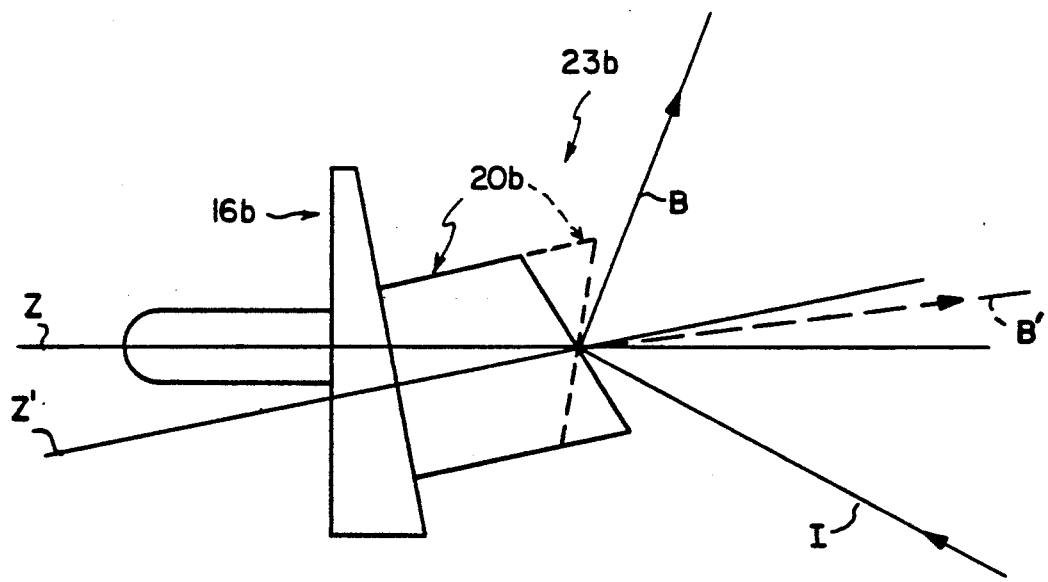

An additional feature of the present invention is that beam displacement on the optical surface of the mount can be completely eliminated. With reference to FIG. 3a, there is shown a mount 23a in which a mirror 20a is mounted on a second mirror 16a. As shown in FIG. 3a, an input beam I strikes mirror 20a at a point $S_a$ which is the intersection of the axis Z and the mirror surface 27a. Rotation of the mount 23a will not displace the output beam along the Z axis; however, rotation of mirror 20a about an axis Z' from a solid-line position to the dotted-line position, shown in FIG. 3a, will displace the beam from point $S_a$ to a point $S_b$. This displacement is generally very small since the angles $\alpha$ and $\beta$ are small. As shown in FIG. 3b, by having the axis of rotation Z' of element 20b go through point $S_a$, that is the point where the input beam I strikes surface 27, the displacement of the beam on the optical surface is eliminated altogether.

Figure 5:
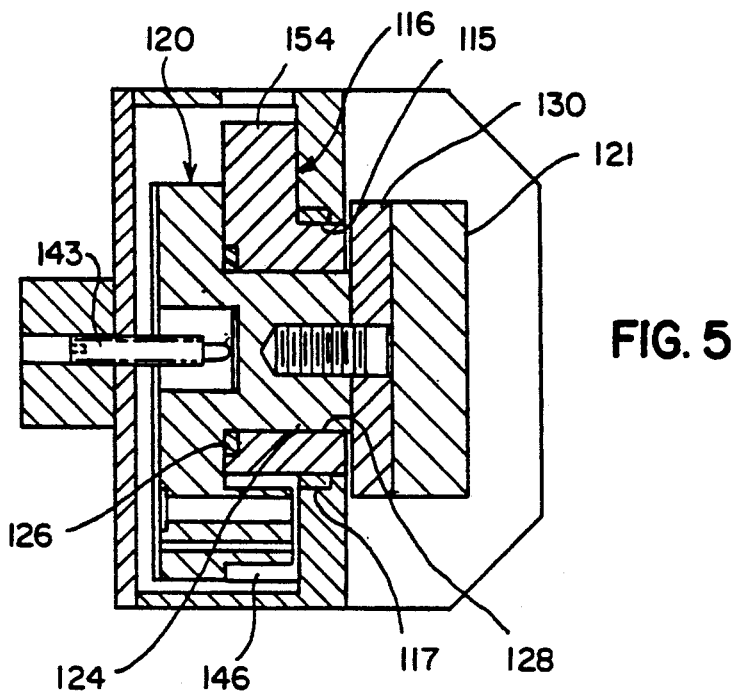
FIG. 5 is a sectional view taken along the line 5—5 in FIG. 4.
Figure 6:
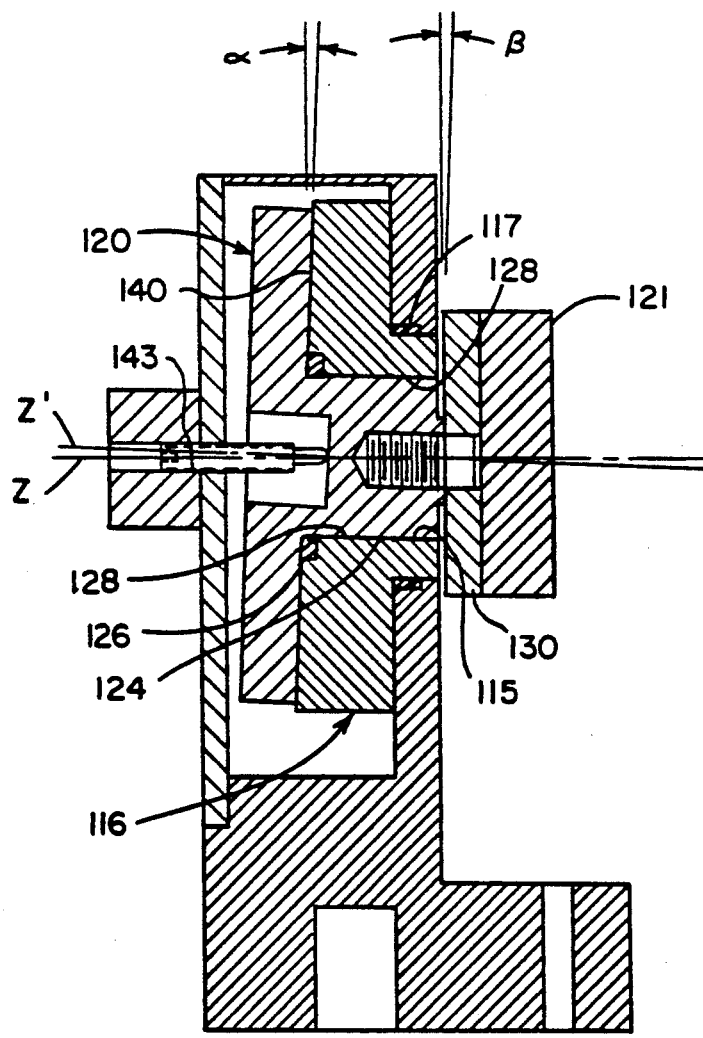
FIG. 6 is a sectional view taken along the line 6—6 in FIG. 4.
Figure 7:
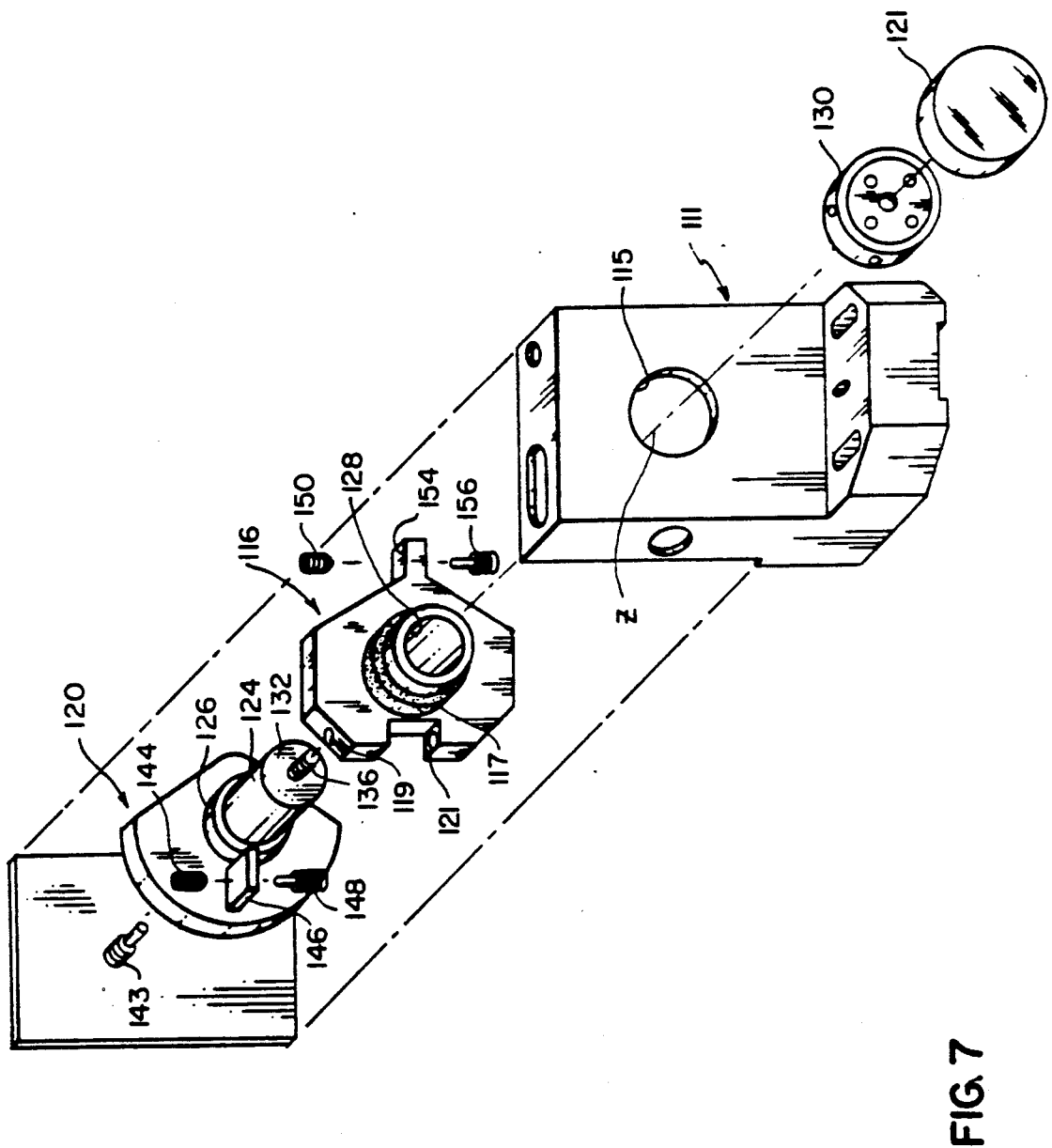
FIG. 7 is an exploded perspective view of the mount shown in FIG. 4.

In FIGS. 4-7, there is shown a mount 110 constructed in accordance with a preferred embodiment of the present invention. Mount 110 comprises a base 111 which is adapted to receive a support 116. Support 116 is rotatably mounted in base 111 for adjustment about a Z axis. A bushing 117 on support 116 is received in a bore 115 in the base 111. A holder 120 is adapted to support a circular mirror 121. Holder 120 is mounted for rotation in support 116 about a Z' axis (FIG. 6). Holder 120 includes a cylindrical element 124 having a bushing 126 thereon which is received in a bore 128 in support 116. Mirror 121 is mounted to a disc 130 which is in turn mounted on a face 132 (FIG. 7) on element 124 by means of a screw 136. Face 132 is disposed at a small angle ($\beta$ angle) to a plane perpendicular to the Z' axis. Also, a surface 140 (FIG. 6) on support 116 is disposed at a small angle ($\alpha$ angle) to a plane which is perpendicular to the Z' axis. As shown in FIGS. 5-7, holder 120 and support 116 are biased into position by a Vlier plunger 143.

Adjustment of holder 120 about the Z' axis is accomplished by means of a screw 144 which bears against a tab 146 and is received in a threaded bore 119 in support 116. A spring 148, supported in a bore 121 in support 116, bears against tab 146, as shown in FIG. 7, to maintain holder 120 in an adjusted position. As explained above, rotational movement of holder 120 will cause an output beam B from mirror 121 to move along an arc in an X direction. Adjustment of support 116 about the Z axis can be accomplished by a screw 150 which is threadably received in base 111 and bears against a tab 154 on support 116. A spring 156, also supported in base 111, bears against tab 154 to maintain the support 116 in an adjusted position. Rotational movement of support 116 and the holder 120 thereon moves an output beam from mirror 121 along a second arc in a Y direction.

The invention has been described in detail with particular reference to a preferred embodiment thereof, but it will be understood that variations and modifications can be effected within the spirit and scope of the invention.

We claim:

1. A mount for an optical element having an optical surface thereon which is adapted to receive an input beam of light and to project an output beam of light therefrom, said mount being adjustable to position said output beam of light along a first direction in the form of an arc and along a second direction in the form of an arc, said first and second directions intersecting at a point and said first and second directions being generally perpendicular at said point of intersection, said mount comprising:

means for supporting said optical element for rotation about a first axis;

means for effecting rotation of said optical element about said first axis to move said output beam of light along said first direction;

means for supporting said element for rotation about a second axis disposed at a small angle to said first axis;

means for effecting rotation of said element about said second axis to move said output beam of light along said second direction; and said means for effecting rotation about said first axis and said second axis being disposed such that an equal amount of rotation about each of said first and second axes will produce an equal amount of movement of said output beam of light along said first and second directions.

2. A mount for an optical element, as defined in claim 1, wherein said first and second axes intersect at a point on said optical surface where said input beam strikes said optical surface.

* * * * *